United States Patent [19]

Fries et al.

[11] Patent Number: 5,422,386
[45] Date of Patent: *Jun. 6, 1995

[54] PROCESS TO SIMULTANEOUSLY REACTOR-FILL POLYOLEFINS AND COMPATIBILIZE FILLERS WITH POLYOLEFINS

[75] Inventors: Richard W. Fries, Joliet; Thaddeus W. Klimek, Orland Park, both of Ill.

[73] Assignee: Quantum Chemical Corporation, Cincinnati, Ohio

[*] Notice: The portion of the term of this patent subsequent to May 2, 2012 has been disclaimed.

[21] Appl. No.: 114,038

[22] Filed: Aug. 30, 1993

[51] Int. Cl.⁶ ............... C08K 9/02; C08K 9/04; C08F 4/655
[52] U.S. Cl. ............... 523/344; 524/855; 526/119
[58] Field of Search ............... 523/344; 524/855; 526/119

[56] References Cited

U.S. PATENT DOCUMENTS

| | | | |
|---|---|---|---|
| 3,950,303 | 4/1976 | Lipscomb | 523/200 |
| 4,004,071 | 1/1977 | Aishima et al. | 526/116 |
| 4,093,789 | 6/1978 | Kuroda et al. | 526/114 |
| 4,104,243 | 8/1978 | Howard, Jr. | 523/333 |
| 4,204,050 | 5/1980 | Bressler et al. | 526/97 |
| 4,374,753 | 2/1983 | Pullukat et al. | 502/111 |
| 4,473,672 | 9/1984 | Bottrill | 523/215 |
| 4,530,913 | 7/1985 | Pullukat et al. | 502/104 |
| 4,564,647 | 1/1986 | Hayashi et al. | 523/211 |
| 4,950,631 | 8/1990 | Buehler et al. | 502/119 |
| 5,013,802 | 5/1991 | Tajima et al. | 526/86 |
| 5,098,969 | 3/1992 | Buehler et al. | 526/119 |

OTHER PUBLICATIONS

"Polymerization of Ethene by Ziegler Catalysts in the Presence of Fillers", Schoppel, et al., Makromol. Chem., Rapid Commun., vol. 3, pp. 483–488 (1982).

Primary Examiner—Paul R. Michl
Assistant Examiner—John J. Guarriello
Attorney, Agent, or Firm—William A. Heidrich

[57] ABSTRACT

The present invention relates to a process to simultaneously reactor-fill polyolefins and to a compatibilized, reactor-filled polyolefin composite produced by the process of the instant invention. More specifically, the instant invention provides a process to simultaneously reactor-fill-polyolefins comprising the steps of (a) treating a filler with a catalytic amount of an organometallic compound prior to using the filler for in-situ polymerization; (b) contacting the product of step (a) in random order of no specific sequence with a high activity polymerization catalyst, a cocatalyst, and, if necessary a cocatalyst modifier such that said contacting results in the formation of an interpenetrating, compatibilizing polymer in the pores and surface of the filler when exposed to a monomer; and (c) adding an alpha-olefin under olefin polymerization reaction conditions to the reaction product of step (b) to form a reactor-filled composite.

32 Claims, No Drawings

PROCESS TO SIMULTANEOUSLY REACTOR-FILL POLYOLEFINS AND COMPATIBILIZE FILLERS WITH POLYOLEFINS

FIELD OF THE INVENTION

The present invention relates to a process to simultaneously reactor-fill polyolefins and, more particularly, to compatibilize, reactor-filler polyolefins. More specifically, the present invention relates to a process to simultaneously reactor-fill polyolefins comprising the steps of (a) treating a filler with a catalytic amount of an organometallic compound prior to using the filler for in-situ polymerization; (b) contacting the product of step (a) in no specific order with a high activity catalyst, a cocatalyst, and, if necessary a cocatalyst modifier such that said contacting results in the formation of an interpenetrating, compatibilizing polymer in the pores and on the surface of the filler; and subsequently thereafter (c) adding an alpha-olefin under olefin polymerization reaction conditions to the reaction mixture of step (b) to form a reactor-filled composite.

The present invention further relates to a compatibilized, reactor-filled polyolefin composite obtained from the process of the present invention. The reactor-filled polyolefin composites produced by the instant invention are characterized as containing low levels of fines and having an essentially uniform distribution of filler particles blended throughout the composite matrix.

BACKGROUND OF THE INVENTION

The use of organic polymers in numerous applications has grown in recent years to the degree that rigid polymers such as nylons and polyacetal resins have almost replaced the more conventional metal, wood, and ceramic materials. The development of low cost and efficient methods of preparing polyolefins has made them excellent candidates for a wider range of applications provided that certain physical properties such as heat distortion temperature, stiffness and hardness can be improved.

In recent years, much research has been conducted in the field to develop various methods for improving the physical properties of polyolefins. A vast majority of this research has been directed towards filling polyolefins with finely divided solids or fibrous fillers. One such method of providing filled polyolefins is by melt mixing the polyolefin with the filler material. This procedure, however, requires that the polyolefin be of relatively low molecular weight, that is, have an inherent viscosity less than about 1. While the resulting polymeric products produced by this method generally have increased stiffness, they do suffer from the disadvantage of lower elongation and increased brittleness.

Furthermore, serious problems of compounding these polymers prepared by melt mixing are encountered including the large power requirements for mixing machinery, degradation of the polymers by heating, nonuniformity of filler dispersion, and poor adhesion of the polymer to the filler, even when coupling agents are employed.

Recently, various methods have been proposed and developed to decrease the problems mentioned above, the most widely used method being the polymerization of an olefin in the presence of selected fillers. One suggested method of effecting olefin polymerization on the filler is by employing a coordination catalyst. In this method, well-known coordination catalysts comprising the combination of transition metal halides and esters and a reducing compound such as an organometallic compound of a metal of Group Ia, IIa or IIIa of the Periodic Table of Elements are generally employed. This method in general, however, has not provided toughness in highly filled polyolefin compositions.

Another method of improving the physical properties of polyolefins using a filler material is disclosed in U.S. Pat. No. 3,950,303 to Lipscomb. This reference describes a process for polymerizing olefins onto a chromium-modified filler in the presence of an organometallic compound. Moreover, the process disclosed by Lipscomb involves (a) contacting an inorganic filler material with a solution of a chromium(III) compound whereby the chromium compound is adsorbed onto the surface of the filler; (b) activating the chromium-modified filler by drying; (c) dispersing the filler as a slurry in an inert, liquid hydrocarbon; (d) adding an organoaluminum compound to said slurry; and (e) polymerizing an olefin in said slurry. This method is said to result in the formation of an essentially homogeneous, filled polyolefin composition having a good combination of hardness, toughness and stiffness.

U.S. Pat. No. 4,104,243 to Howard, Jr. relates to a process for preparing low viscosity inorganic filler compound dispersions and the use of the same in the preparation of polyolefin/inorganic filler compositions. More specifically, the process as described in the reference involves dispersing a large amount of a finely divided inorganic filler compound as a slurry in an inert hydrocarbon diluent in the presence of an organoaluminum compound. This dispersion may then by contacted with a transition metal polymerization catalyst and an olefin to produce a polyolefin/filler composition.

U.S. Pat. No. 4,473,672 to Bottrill relates to a process of producing a polymer composition which is a composite material containing an olefin polymer and a filler. Moreover, the patentee discloses a polymer composite which is produced by polymerizing an olefin monomer in the presence of a catalyst system obtained by reacting a filler material with (a) an organic magnesium compound which contains a halogen or (b) an organomagnesium compound and thereafter with a halogen-containing compound; and then treating that reaction product with a transition metal compound, which is preferably TICl$_4$, and an organic activating compound. The resultant homogeneous composites are said to have good flow characteristics.

This method disclosed by Bottrill, however, suffers from the disadvantage that the composite will contain a halogen, therefore, it is necessary to carry out a deashing step. The use of a deashing step is undesirable since those skilled in the art are aware that halogens can adversely affect the polymer product as well as cause corrosion of the machinery used to process the final product.

One such method of overcoming the deashing problem described above is disclosed in U.S. Pat. No. 4,564,647 to Hayashi et al. which relates to a process for producing a polyethylene composition which comprises polymerizing ethylene in the presence of a catalyst comprising a contact treatment product of a high activity catalyst component, a filler and an organoaluminum compound. This process has no need for a deashing step since the catalyst employed has a remarkably high activity with a very low amount of halogen.

Schöppel et al., Makromal. Chem., Rapid Commum., Vol. 3 (1982), pp 483-488 provides a procedure which leads to filled polymers with strong polymer-filler interactions by fixing one component of the catalyst onto the surface of the filler. The reference typically uses $TiCl_4$ as a fixing agent and the catalysts are normal Ziegler catalysts such as $Mg(OEt)_2/TiCl_4/Al(iBu)_3$. The procedure described by Schöppel et al. is said to result in high catalyst activity compared with prior art systems.

Despite the current state of the art, none of the references disclosed hereinabove relate to the current process to simultaneously reactor-fill polyolefins. That is, none of the references disclosed hereinabove relate to a process to simultaneously reactor-fill polyolefins comprising the steps of (a) treating a filler with a catalytic amount of an organometallic compound (b) contacting the product of step (a) in random order of no specific sequence with a high activity polymerization catalyst, a cocatalyst and, if necessary, a cocatalyst modifier such that said contacting results in the formation of an interpenetrating, compatibilizing polymer in the pores and on the surface of the filler; and (c) adding an alpha-olefin under olefin polymerization reaction conditions to the reaction mixture of step (b) to form a reactor-filled composite having a uniform distribution of filler dispensed therein.

SUMMARY OF THE INVENTION

The present invention relates to a process to simultaneously reactor-fill polyolefins and to compatibilize the filler with the polyolefin. More specifically, the process of the present invention involves first treating a filler with a catalytic amount of an organometallic compound prior to using the filler for in-situ filled polymerization with a high activity polymerization catalyst system. This treatment of the filler with an organometallic compound will result in formation of an interpenetrating, compatibilizing polymer in the pores and on the surface of the filler when the premix is exposed to a cocatalyst and an olefin. The organometallic compounds employed in the present invention to initiate the formation of the interpenetrating polymer are catalytic poisons to the high activity polymerization catalyst system unless it is first dispensed on the filler.

The treated filler is then contacted in random order of no specific sequence with a high activity polymerization catalyst, a cocatalyst, and if necessary, a modifying compound. This contacting process results in the formation of an interpenetrating, compatibilizing polymer in the pores and on the surface of the filler when exposed to a monomer. An alpha-olefin is then added to the above reaction mixture under olefin polymerization conditions to cause the formation of a reactor-filled polyolefin composite having a relatively uniform distribution of filler particles blended therein.

The treatment of the filler with the organometallic compound prior to the polymerization reaction results in improved catalytic activity over an unfilled polymerization catalyst system or by that afforded by the elimination of the organometallic compound.

In another aspect, the present invention also relates to compatibilized, reactor-filled polyolefin composites obtained by the present method of reactor-filling polyolefins. The resultant reactor-filled polyolefin composites obtained herein are characterized as having a uniform distribution of filler particles blended therein and having a fewer number of fines than prior art composites. Moreover, the reactor-filled composites produced by the instant invention exhibit improved physical and rheological properties compared to prior art reactor-filled composites.

DETAILED DISCUSSION OF THE INVENTION

In accordance with the inventive method, a filler material is initially contacted with a catalytic amount of an organometallic compound which will cause the formation of a polyolefin on the surface and in the pores of the filler material when the premix is exposed to a suitable cocatalyst and an olefin. By premix, we mean the reaction product obtained by treating the filler with an organometallic compound. A feature of the present invention is that the organometallic compound is a poison to the high activity polymerization catalyst unless it is first adsorbed on the filler.

The fillers employed by the present invention are any of the conventional fillers which are well known and established in the art. Suitable fillers employed by the present invention include, but are not limited to, mica, talc, $CaCO_3$, kaolin, $Mg(OH)_2$, clay, diatomacetous earth, $CaSO_4$ (amorphous and acicular), fly ash, silica, glass spheres and fibers, polyvinyl alcohol, graphite, titanium dioxide, carbon black, copper, aluminum and the like. Of these fillers, mica, kaolin and talc are particularly preferred.

Moreover, the fillers employed in the present invention are characterized as having a surface area of about 0.1 $m^2$/gm to about 500 $m^2$/gm and a median particle size of about 0.5 microns to about 50 microns.

In a preferred embodiment of the instant invention, the filler is dried and deoxygenated prior to treatment with the organometallic compound to remove any surface hydroxyl groups which may inhibit the activity of the resultant catalyst system.

To cause effective removal of surface hydroxy groups from the surface of the filler, the filler is dried in an inert atmosphere at temperatures of at least 50° to about 150° C. for a period of about 0.5 to about 72 hrs. More preferably, drying of the filler is performed in an oven at a temperature from about 100° to about 150° C. for a period of about 10 to about 24 hrs in an inert gas atmosphere, such as nitrogen or argon.

The deoxygenating process can be carried out by evacuating the system under full vacuum and then refilling the system with moisture-free nitrogen at room temperature. This process of evacuating and refilling can be repeated from about 3 to about 6 times. The deoxygenation process may also be carried out by flowing moisture-free $N_2$ over the dried filler material for about 0.5 to about 24 hrs at a temperature of about 25° to about 150° C.

The dried, deoxygenated filler is then reacted with an organometallic compound which when reacted with a suitable cocatalyst is effective in causing the formation of a sticky prepolymer on the surface and in the pores of the filler. That is, the addition of the organometallic compound to the filler during polymerization results in the formation of a sticky prepolymer on the surface and in the pores of the filler. This sticky prepolymer which is formed on the filler is believed to act as an adhesive which binds the larger polymer particles onto the surface of the filler.

As mentioned previously hereinabove, the organometallic compound employed by the present invention is a poison to the high activity polymerization catalyst unless it is first adsorbed upon/within the filler. The organometallic compounds useful in the present invention which satisfy the above criterion are transition metal esters of the formula $M(OR)_a$ wherein M is a metal from Groups IVB, VB, and VIB of the Periodic Table of Elements; R is aryl, alkyl, aralkyl, cycloalkyl carbonyl, heteroatom containing group, alkylsilyl or combinations thereof; and a is 3 or 4. In a preferred embodiment of the present invention, M is Ti or Zr; R is alkyl; and a is 4.

The catalytic amount of the organometallic compound added to the filler to initiate the formation of a polyolefin on the surface and in the pores of the filler is from about 1 to about 1000 μmol per gram of filler. Preferably, the concentration range of the organometallic compound added to the filler is from about 1 to about 100 μmol per gram of filler. More preferably, the concentration range of the organometallic compound added to the filler is about 1 to about 10 μmol per gram of filler.

The addition of the organometallic compound to the filler may be conducted neat or in a hydrocarbon solvent which may be either liquid or gaseous under the conditions employed by the present invention. It is a preferred embodiment of the present invention that the organometallic compound be solubilized in a liquid hydrocarbon solvent.

The hydrocarbon solvents employed in the present invention to solubilize the organometallic compound can be any aliphatic or aromatic hydrocarbon solvents containing from 4 to 15 carbon atoms. In a preferred embodiment, aliphatic hydrocarbon solvents such as isobutane, pentane, hexane, heptane, cyclohexane and the like are used to solubilize the organometallic compound. Of these hydrocarbon solvents, heptane is most preferred.

Prior to use, the hydrocarbon solvents should be purified, e.g. by percolation through silica gel and/or molecular sieves to remove trace quantities of water, oxygen, polar compounds, and other materials capable of adversely affecting the catalyst activity.

Furthermore, all of the contacting steps described herein are carried out in inert atmosphere, such as nitrogen; thus, preventing any air or moisture to come into direct contact with the organometallic compound and/or the filler.

This contact between the organometallic compound and the filler occurs at a temperature from about 0° to about 100° C. More preferably, the temperature of this contacting step is from 15° to about 35° C. Most preferably, the temperature is from about 20° to about 30° C.

The time employed for the treatment of the filler with the organometallic compound is from about 0.1 to about 100 hrs. Most preferably, the time of this treatment step is from about 1 to about 24 hrs.

The above reaction product is then contacted in random order of no specific sequence with a high activity polymerization catalyst, if necessary, a modifying compound(s) and at least one cocatalyst component.

The high activity polymerization catalysts employed by the present invention are solid catalyst components as described in coassigned U.S. Pat. Nos. 4,374,753, 4,950,631, and 5,098,969 the contents of which are incorporated herein by reference. Moreover, the high activity polymerization catalyst employed by the present invention is a solid catalyst which is effective in alpha-olefin polymerization reactions. The term high activity catalyst as used herein means any catalyst which is able to produce an isotactic polymer product or high density polyethylene polymer.

The preferred high activity polymerization catalyst utilized in the present invention is prepared by initially contacting a support either inorganic, such as silica, or organic such as a polyolefin, with at least one organomagnesium compound and, as appropriate, a modifying compound or an alcohol. The modifying compound is employed herein when a polypropylene polymer is desirable whereas an alcohol is used when a polyethylene polymer is desirable.

A preferred support is silica that has a high surface area and high pore volume. The silica employed in the current catalyst system is preferably pure however, it may contain minor amounts of other inorganic oxides. In general, the silica support comprises at least 90%-95% by weight pure silica. In one preferred embodiment the silica is at least 99% pure.

The silica support utilized in the preparation of the catalyst, is preferably a high surface area, high pore volume material defined by a surface area between 50 $m^2/gm$ and about 500 $m^2/gm$; a median particle size of about 20 microns to about 200 microns and a pore volume of about 0.5 cc/gm to about 3.0 cc/gm as determined by Standard B.E.T. measurements.

It is a preferred embodiment of the invention that the silica support be pretreated prior to its use to remove any impurities or surface hydroxyl groups which may inhibit the activity of the resultant catalyst component.

To cause effective removal of surface hydroxyl groups from the surface of the silica support, the silica may be calcined in an inert atmosphere at a temperature of at least 150° C. Preferably, calcination of the silica is performed in the temperature range from about 150° C. to about 650° C. in an inert gas atmosphere, i.e. nitrogen or argon.

Another method of removing surface hydroxyl groups involves contacting the silica with a hexaalkyl disilazane or chlorosilanes as disclosed in U.S. Pat. No. 4,530,913 of Pullukat et al., for example. Of the hexaalkyl disilazane useful in this application, hexamethyl disilazane, i.e., H.M.D.S., is particularly preferred.

The silica may also be pretreated by combining the calcination method and treatment with a hexaalkyl disilazane. In this method, the sequence of pretreatment may be random; however, it is a preferred embodiment that the hexaalkyl disilazane treatment precede the calcination process.

The pretreated silica is then reacted with an organomagnesium compound which is soluble in organic solvents. The organomagnesium compounds useful in the present invention are the alkyls, alkoxides or aryls of magnesium or its complexes such as complexes with alkyl aluminum compounds. The structure formulas of some of the preferred organomagnesium compounds are $R^2MgX_1$, $R'_2Mg$ and $(R_2^2Mg)_nAlR_3^2$ where R' and $R^2$ are each independently an alkyl or alkoxide containing from about 1 to about 12 carbon atoms or aryls such as phenyl, naphthyl, and cyclopentadienyl; n is 0.5-10, and X is a halide such as chloride or bromide. Complexes of organomagnesium compounds with organo-aluminum halides can also be used. The complexes may contain small amounts of alkoxide. Of the organomagnesium compounds contemplated herein, alkoxymagnesium chlorides are most particularly preferred.

The magnesium-aluminum complex is well known in the art, as disclosed in Aishima et al., U.S. Pat. No. 4,004,071 at column 2, lines 34-40 and column 3, lines 30-36. The complex is prepared according to the teachings of Ziegler et al., Organometallic Compounds XXII: Organomagnesium-Aluminum Complex Compounds, Annalen der Chemie, 605, pp. 93–97 (1957).

The amount of organomagnesium compound added to make the solid catalyst component of the present invention is from about 0.01 to about 5 mmol per gram of silica. More preferably, the concentration range of the organomagnesium compound is from about 0.6 to about 1.25 mmol per gram of $SiO_2$.

The reaction mixture containing the organomagnesium compound and silica may then be optionally treated with an alcohol. Suitable alcohols include aliphatic or aromatic alcohols containing from about 1 to about 12 carbon atoms. In a preferred embodiment of the present invention, the alcohol is an aliphatic alcohol containing from 1 to 5 carbon atoms. Of these preferred alcohols, n-butyl alcohol is particularly preferred.

The amount of alcohol added to the reaction mixture is from about 0 to about 5 mmol per gram of silica. More preferably, the concentration range of alcohol is from about 0.5 to about 1.25 mmol per gram of silica.

The modifying compounds that may be optionally employed by the present invention as a catalyst component are silanes having the formula $SiH_rX_s^2$, where $X^2$ is halogen; r is 0 or an integer of 1 to 3; and s is an integer from 1 to 4; with the proviso that the sum of r and s is 4. These modifying compounds are added to the reaction mixture containing the organomagnesium compound and the silica and are employed when a polypropylene polymer is desirable. Suitable silanes having the above formula include silicon tetrachloride, trichlorosilane, tribromosilane, dichlorosilane, dibromosilane and mixtures thereof. Of these silanes, silicon tetrachloride is most particularly preferred.

The concentration of the modifying compound employed by the present invention as a catalyst component is from about 0.1 to about 5 mmol per gram of silica. More preferably, the molar ratio of the modifying compound to silica is from about 0.6 to about 1.25 mmol per gram of $SiO_2$.

The contacting step between the silica and the soluble organomagnesium compound(s) usually occurs at a temperature in the range of between about 15° C. and about 120° C. More preferably, this contact occurs at a temperature in the range of between about 50° C. and 110° C. The contact occurs over a period of between about 30 minutes and about 4 hours. Preferably, the contact occurs over a period of between about 1 hour and about 3½ hours. Still more preferably, this contact occurs over a period of between about 1½ hours and about 2½ hours.

The organic solvent employed to solubilize the organomagnesium compounds can be any aliphatic or aromatic hydrocarbon solvents mentioned previously hereinabove.

In yet another preferred embodiment, the reaction product of the magnesium component and silica component is then dried under precisely defined conditions until most of the heptane solvent is removed. The drying process utilized by the present invention has been previously described in coassigned patent applications U.S. Ser. No. 854,199 filed Mar. 20, 1992, (now U.S. Pat. No. 5,221,650) and U.S. Ser. No. 984,052 filed Nov. 30, 1992, (now U.S. Pat. No. 5,275,991) the contents of which are incorporated herein by reference. This drying process is effective in providing effective wetting of the surface area of said compound such that a regular essentially continuous distribution of accessible magnesium values is present on the support material for further reaction. The process provides a statistically averaged surface coverage of magnesium values of about 1 to about 3 layers.

Typically, drying will be conducted under an atmosphere of and with a slow purge e.g. 10 ml/min. of nitrogen; in small volumes the granular coated support may be dried in a paddle stirred container with heat supplied from an external source.

The solid product containing the organomagnesium compound is then reacted with at least one or more transition metal compounds belonging to Groups IVB and/or VB or the Periodic Table.

The transition metal compounds belonging to Group IVB of the Periodic Table have the structure formula $M'X^2_p(OR')_q$ wherein M' is titanium or zirconium; R' is aryl, alkyl, aralkyl, cycloalkyl or alkylsilyl; $X^2$ is a halogen; p is an integer from 1 to 4; and q is 0 or an integer from 1 to 3; with the proviso that the sum of p and q is 4. It is especially preferred that M' be titanium.

In the preferred embodiment, the titanium-containing compound is characterized as "p" being an integer from 2 to 4 and q is 0 or an integer 1 or 2. Suitable titanium compounds within the contemplation of this embodiment are titanium tetrachloride, titanium tetrabromide, methoxytitanium trichloride, ethoxytitanium trichloride, diethoxytitanium dichloride and the like.

Still, more preferably, the titanium-containing compound is defined by "p" being 4, "q" being 0, and $X^2$ is chlorine or bromine. Thus, the titanium compound is most preferably titanium tetrachloride or titanium tetrabromide. Of these two titanium compounds, titanium tetrachloride is most preferred.

Suitable transition metal compound belonging to Group VB are compounds that have the structural formula $M''(OR')_x(O)_y(X^2)_z$ wherein M" is a metal of Group VB; R' is a hydrocarbyl having from 1 to 18 carbon atoms; $X^2$ is halogen; x is 0 or an integer from 1 to 5; and y is 0 or 1; and $z=(5-x-2y)$ or 4 or 3 when $x=0$, $y=0$. It is especially preferred that M" be vanadium.

Suitable vanadium compounds encompassed by the above formula include vanadium oxyhalides, vanadium alkoxides, vanadium carboxylates, vanadium halides and mixtures thereof. It is especially preferred that the vanadium-containing compound be vanadium tributyloxy, triisobutyl vanadate, vanadium tetrachloride, and the like thereof.

This contact between the transition metal-containing compounds and the organomagnesium-containing solid product occurs at a temperature from about 0° to about 100° C. More preferably, the temperature of this contacting step is from 20° to about 100° C. Most preferably, the temperature is from about 25° to about 50° C.

The time employed for contacting the solid product with the transition metal-containing compounds is from about 0.25 to about 4 hrs. Most preferably, the time of this contacting step is from about 0.25 to about 1 hr.

The concentration range of transition metal-containing compound (Tm) employed by the present invention is from about 0.01 to about 5 mmol of transition metal compound per gram of silica. More preferably, the concentration of transition metal compound used in this contacting step is from about 0.05 to about 1.0 mmol of transition metal compound per gram $SiO_2$.

It should be appreciated that all the treatment steps in the formation of the high activity catalyst component of this invention, the contact of silica with the organomagnesium compound and the transition metal compounds, involve contact between a solid, silica, and a liquid. This is because each of the compounds that are contact with the silica are liquids or are soluble in an inert hydrocarbon solvent under the conditions employed by the present process. As such, no ball-milling or other solid mixing is required. Ball-milling is an expensive and difficult operation, usually in the formation of polymerization catalysts of the prior art; it is thus eliminated. Those skilled in the art are aware, in the case where a hydrocarbon is employed, that the solvent may be allowed to remain with the reaction mass or can be removed by decantation, filtration, evaporation, or the like.

The cocatalyst components employed by the present invention are conventional aluminum-containing cocatalysts well known in the art. It is an embodiment of the present invention that the aluminum-containing cocatalysts are effective in activating both the organometallic compound as well as, the high activity polymerization catalyst component.

The aluminum-containing cocatalysts are preferably alkylaluminum-containing compounds. Alkylaluminum-containing compounds suitable for the present process include trialkylaluminum, alkylaluminum halide, alkylaluminum hydride, aluminoxane (either cyclic or linear) or mixtures thereof. More preferably, the cocatalyst is a trialkylaluminum compound. Of the trialkylaluminum compounds triethylaluminum is particularly preferred.

The molar ratio of aluminum-containing cocatalyst to high activity polymerization catalyst is from about 1 to about 200. More preferably, the molar ratio of cocatalyst to high activity catalyst is from about 5 to about 100.

The cocatalyst modifiers that may be optionally employed by the present invention are required when a polymer of polypropylene is being produced. The cocatalyst modifiers of this invention are hydrocarbyl alkoxysilanes. Preferred hydrocarbyl alkoxysilanes include hydrocarbyl trialkoxysilanes, dihydrocarbyl dialkoxysilanes and trihydrocarbyl alkoxysilanes. Of the hydrocarbyl trialkoxysilanes, those preferred involve a hydrocarbyl having the meaning phenyl and $C_1$–$C_6$ alkyl; and a $C_1$–$C_{10}$ trialkoxy. Particularly preferred species include hexyltrimethoxysilane, amyltriethoxysilane and isobutyltrimethoxysilane.

The reaction product obtained above is then contacted with an alpha-olefin under alpha-olefin polymerization reaction conditions. Alpha-olefins suitable in this reactor-filled method include α-olefins containing from two to twelve carbon atoms such as ethylene, propylene, butene, pentane, and the like. Mixtures of these alpha-olefins are also contemplated herein.

In a particularly preferred embodiment of the present invention, the olefin polymerized is propylene.

In this preferred embodiment, polymerization of propylene occurs at a temperature in the range of between about 40° C. and 250° C. More preferably, the temperature of this reaction is in the range of about 50° C. and about 150° C. The pressure of the propylene polymerization reaction is in the range of between about 50 psig and about 1000 psig, more preferably between about 100 psig and about 700 psig. In a preferred embodiment the propylene polymerization occurs in the presence of hydrogen gas.

In another aspect, the present invention relates to reactor-filled polyolefin composites obtained from the present method of reactor-filled polyolefins. The reactor-filled polyolefin composites produced by employing the reactor-filled method of the instant invention are characterized as having improved physical properties such as melt index, as well as rheological properties such as flexural modulus, compared to an unfilled polymer or a composite obtained using prior art systems. Furthermore, the reactor-filled composites produced herein have a relatively uniform distribution of filler particles blended therein and higher yields of the composite can be obtained thus savings in compounding and extrusion costs are immediate benefits obtained from the present invention. The resultant composites prepared by the instant invention also contain a reduced number of fines dispensed in the composite. By reduced number of fines, we mean that the reactor-filled composites contain less than about 1% of fines which have an average particle size of less than 45 microns. The filler particles which are blended into the composite may be powdery, fibrous, pulverized, spherical or granular in shape. Furthermore, since the melt index of the composite blend can be controlled by the polymer product formed in-situ, materials useful for injection molding and compression molding are obtained whereas prior art reactor-filled composites are mostly suitable in compression molding processes.

The reactor-filled polyolefin composites produced by the present invention are suitable for a wide range of applications such as U.V. stabilizers, wires and cables; flame retardants and the like. Additionally, the present reactor-filled composites may be employed in a variety of applications wherein high flexural modulus, high impact strength or high tensile strength is desired.

The following examples are given to illustrate the scope of the present invention. Because these examples are given for illustrative purposes only, the invention embodied therein should not be limited thereto.

EXAMPLES 1-27

Polypropylene was prepared under bulk or liquid propylene conditions at 83° C. Hydrogen was used to control the molecular weight of the product. A reactor size of 1 liter was used in these examples at a reaction time of 1.5 hrs.

Polyethylene was prepared using heptane as the polymerization diluent in a 1 liter autoclave. Polymerizations were run at 80°–90° C. for 1–1.5 hrs. Hydrogen was added to control molecular weight by a pressure drop of 20 psig form a 150 cc vessel. Ethylene pressure was 400 psig.

Example 1-7 (Table 1) show the effect of adding a commercially available pellets of a titanate coupling agents to a propylene polymerization while reactor-filling. These examples indicate that the coupling agent itself is a poison to the polymerization catalyst.

Examples 8-10 (Table 2) indicate that the addition of a solution of a commercially available liquid titanate coupling agent also will poison the polymerization catalyst.

Examples 11-16 (Table 3) show that once the coupling agent is supported on a filler, this filler is catalytically active when treated with a cocatalyst.

Examples 17-22 (Table 4) show the preferred embodiment of the invention in which the filler is pretreated with a small amount of coupling agent before addition of the remaining catalyst components. Under similar reaction conditions, the polymerization catalyst is not poisoned and the composites are prepared with good bulk densities and melt flows.

Example 23–27 (Table 5) show that since the coupling agent on filler is catalytically active it can prepolymerize alpha olefins to compatibilize the filler with the polypropylene formed in the reactor. Again good bulk densities, melt flows and high yields of polymer can be achieved.

The catalysts fillers and coupling agents shown are only examples. Other polymerization catalysts, fillers and organometallic coupling agents are expected to preform similarly.

TABLE 1
COUPLING AGENTS AS CATALYST POISONS

| EXAMPLE | CATALYST | COUPLING AGENT | FILLER | YIELD OF POLYPROPYLENE |
|---|---|---|---|---|
| 1 | TiCl$_3$ED/DEAC | 0 | 0 | 41.0 g |
| 2 | TiCl$_3$ED/DEAC | 0.5 g KAPS[a] | 0 | 23.5 g |
| 3 | TiCl$_3$ED/DEAC | 0.5 g KAPS[a] | 5 g CaCo$_3$ | 32.5 g |
| 4 | Silica Based[b] Supported Catalyst | 0 | 5 g CaCo$_3$ | 135.0 g |
| 5 | Silica Based Supported Catalyst[b] | 0.5 g KAPS[a] | 5 g CaCo$_3$ | 70.7 g |
| 6 | Silica Based Supported Catalyst[b] | 0 | 5 g Clay | 114.0 g |
| 7 | Silica Based Supported Catalyst[b] | 0.5 g KAPS[a] | 5 g Clay | 49.5 g |

[a] = Pelletized titanate coupling agent supplied by Kenrich Petrochemical Inc.
[b] = Catalyst prepared in accordance with Example 1 of U.S. Pat. No. 5,098,969.

TABLE 2
COUPLING AGENTS AS CATALYST POISONS

| EXAMPLE | CATALYST | COUPLING AGENT | YIELD gPP/hr. |
|---|---|---|---|
| 8 | Silica Supported TiCl$_4$ Catalyst | 0 | 262 |
| 9 | Silica Supported TiCl$_4$ Catalyst | LICA AU[a, b] | 198 |
| 10 | Silica Supported TiCl$_4$ Catalyst | LICA AU[a, c] | 202 |

[a] = 0.5 ml of a 5% solution of a titanate coupling agent in heptane supplied from Kenrich Petrochemicals Inc.
[b] = Added to catalyst before addition of TEAL
[c] = Added to catalyst before addition of TEAL

TABLE 3
COUPLING AGENTS DISPERSED ON FILLERS

| EXAMPLE | FILLER | COUPLING AGENT[a] | CO-CATALYST | YIELD[a] gPE/g FILLER/hr |
|---|---|---|---|---|
| 11 | Silica[b] EP-116 | LICA 12U | TEAL | 4.25 |
| 12 | Silica[b] EP-116 | NZ 12U | TEAL | 8.25 |
| 13 | Talc[b] | LICA 12U | TEAL | 5.0 |
| 14 | Polypor[c] | LICA 12U NZ 12U | TEAL | 4 g |
| 15 | Polypor[c] | LICA 12U NZ 12U | EASC | 9 g[d] |
| 16 | Polypor[c] | NZ 12U | EASC/TEAL | 13.6 g |

[a] = Polymerization of 80° C., 160 psig ethylene using triethylaluminum as cocatalyst.
[b] = 2.0 g Filler slurried in 10 ml of 5% coupling agent in heptane, filtered washed with heptane and dried under vacuum.
[c] = 10 g filler, 1 ml each of 5% solutions of coupling agents, filtered, washed and dried under vacuum.
[d] = Polymer contained 3.8 short chain branches/1000 carbon atoms by FTIR
[e] = 0.5 ml of a 5% solution of titanate or zirconate coupling agent in heptane Available from Kenrich Petrochemical Inc.

TABLE 4
ADDITION OF COUPLING AGENTS TO VARIOUS FILLERS USING SILICA SUPPORTED POLYMERIZATION CATALYST TO PREPARE COMPOSITES

| EXAMPLE | FILLER | COUPLING AGENTS[a] | YIELD OF POLYPROPYLENE SYNTHESIZED | % FILL | MELT FLOW | BULK DENSITY |
|---|---|---|---|---|---|---|
| 17 | 0 | 0 | 133 g | 0 | 7 | 19 |
| 18 | Mica | NZ 12U (20 µl) | 173 g | 5 | 3 | 19 |
| 19 | Mica | NZ 12U (70 µl) | 160 g | 6 | 3 | 19 |
| 20 | Mica | NZ 12U (220 µl) | 136 g | 7 | 3 | 21 |
| 21 | Graphite | NZ 12U (10 µl) | 174 g | 5 | 9 | 22 |
| 22 | Celite | NZ 12U (10 µl) | 149 g | 6 | 3 | 18 |

[a] = 5% solution of zirconate coupling agent in heptane, supplied by Kenrich Petrochemical Inc.

TABLE 5
TREATMENT OF FILLERS WITH COUPLING AGENTS IN THE PRESENCE OF ALPHA OLEFINS FOLLOWED BY POLYMERIZATION

| EXAMPLE | FILLER | COUPLING AGENT | ALPHA OLEFIN | YIELD gPP/gcat/hr SYNTHESIZED | MELT FLOW | BULK DENSITY |
|---|---|---|---|---|---|---|
| 23 | 0 | 0 | 0 | 10,740 | 11.6 | 24.9 |
| 24 | 0 | 0.05 µl NZ 12U[a] | Mixed[b] 1 ml | 6,288 | — | — |
| 25 | 25 g Talc | 0.05 µl NZ 12U[a] | Mixed[b] 1 ml | 12,290 | 12.6 | 23.7 |
| 26 | 25 g Talc | 0.10 µl NZ 12U[a] | Mixed[b] 1 ml | 9,530 | 10.7 | 23.9 |
| 27 | 0 | 0 | Mixed[b] | 14,383 | 12.6 | 17.4 |

TABLE 5-continued

TREATMENT OF FILLERS WITH COUPLING AGENTS IN THE PRESENCE OF
ALPHA OLEFINS FOLLOWED BY POLYMERIZATION

| EXAMPLE | FILLER | COUPLING AGENT | ALPHA OLEFIN | YIELD gPP/gcat/hr SYNTHESIZED | MELT FLOW | BULK DENSITY |
|---|---|---|---|---|---|---|
| | | 1 ml | | | | |

$a$ = 5% solution of zirconate coupling agent in heptane from Kenrich Petrochemical Inc.
$b$ = Mixture of $C_6$–$C_{18}$ alpha olefins The above embodiments and examples are given to illustrate the scope and spirit of the present invention. These embodiments and examples will make apparent, to those skilled in the art, other embodiments and examples. These other embodiments and examples are within the contemplation of the present invention; therefore, the instant invention should be limited only by the appended claims.

What is claimed is:

1. A method to simultaneously reactor-fill polyolefins useful for preparing a reactor-filled composite having a relatively uniform distribution of filler particles blended therein comprising the steps of:
   (a) treating a filler with a catalytic amount of a transition metal ester compound, wherein said filler is present in the composite in proportions to act as a filler;
   (b) contacting the product of step (a) in random order with a high activity polymerization catalyst, a cocatalyst, and, if necessary a cocatalyst modifier such that said contacting results in the formation of an interpenetrating, compatibilizing polymer in the pores and on the surface of the filler; and
   (c) adding an alpha-olefin under olefin polymerization conditions to the reaction product of step (b) to cause formation of said reactor-filled composite.

2. The method of claim 1 wherein the filler material is a filler selected from the group consisting of mica, talc, $CaCO_3$, $Mg(OH)_2$, clay, diatomacetous earth, $CaSO_4$, fly ash, silica, glass spheres, glass fibers, polyvinyl alcohol, graphite, carbon black, titanium dioxide, aluminum, and copper.

3. The method of claim 2 wherein the filler material is kaolin, mica or talc.

4. The method of claim 1 wherein the transition metal ester is a transition metal ester of the formula $M(OR)_a$ wherein M is a metal from Groups IVB, VB and VIB of the Periodic Table of Elements; R is aryl, alkyl, aralkyl, cycloalkyl, carbonyl, heteroatom containing group, alkylsilyl or mixtures thereof; and a is 3 or 4.

5. The method of claim 4 wherein M is Ti or Zr; R is alkyl, and a is 4.

6. The method of claim 1 wherein the amount of the transition metal ester added to the filler is from about 1 to about 1000 μmol per gram of filler.

7. The method of claim 6 wherein the amount of the transition metal ester added to the filler is from about 1 to about 100 μmole per gram of filler.

8. The method of claim 1 wherein the filler is dried to effectively remove surface hydroxyl groups from the surface of the filler.

9. The method of claim 8 wherein the filler is dried at 150° C. for about 24 hrs.

10. The method of claim 9 wherein the dried filler is deoxygenated by evacuating under full vacuum and refilling with moisture-free nitrogen prior to the use thereof.

11. The method of claim 1 wherein the transition metal ester is solubilized in a hydrocarbon solvent.

12. The method of claim 11 wherein the hydrocarbon solvent is heptane.

13. The method of claim 1 wherein the high activity catalyst comprises:
   (a) a pretreated inorganic or organic support material;
   (b) an organomagnesium compound;
   (c) at least one transition metal containing compound effective in alpha-olefin polymerization reactions; and, as appropriate,
   (d) an alcohol or a modifying compound.

14. The method of claim 13 wherein the support material is silica.

15. The method of claim 13 wherein the organomagnesium compound is selective from the group consisting of alkyls, alkoxides or aryls of magnesium or its complexes.

16. The method of claim 15 wherein the organomagnesium compound has one of the formulas:

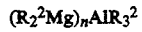

wherein $R^1$ and $R^2$ are each independently alkyl or alkoxide containing from 1 to 12 carbon atoms, or aryls such as phenyl, naphthyl and cyclopentadienyl; n is 0.5–0; and $X_1$ is a halide.

17. The method of claim 16 wherein the organomagnesium compound is an alkoxymagnesium chloride.

18. The method of claim 13 wherein the transition metal compound(s) has the structural formula(s) $M''(OR')_x(O)_y(X^2)_z$ and/or $M'X^2_p(OR')_q$ wherein M'' is a metal of Group VB; $X^2$ is a halogen; R' is aryl, alkyl, aralkyl, cycloalkyl or alkylsilyl; x is 0 or an integer from 1 to 5; y is 0 or an integer from 1 to 3; z=(S−x−2y) or 4 or 3 when x=0; y=0; M' is a metal of Group IVB; and p and q range from 0 to 4 with the proviso that sum of p and q is 3 or 4.

19. The method of claim 18 wherein the transition metal compound has the formula $M'X^2_p(OR')_q$ wherein M' is titanium; p is an integer from 2 to 4; q is 0 or an integer from 1 to 2 and R' is chloride.

20. The method of claim 19 wherein p is 4 and q is 0.

21. The method of claim 13 wherein the alcohol is n-butyl alcohol.

22. The method of claim 13 wherein the modifying compound is a silane having the formula $SiH_rX_s^2$, where $X^2$ is halogen; r is 0 or an integer from 1 to 3; s is an integer from 1 to 4; with the proviso that the sum of r and s is 4.

23. The method of claim 22 wherein the halogenated silane is silicon tetrachloride.

24. The method of claim 1 wherein the cocatalyst is an aluminum-containing cocatalyst.

25. The method of claim 24 wherein the aluminum-containing cocatalyst is selected from the group consisting of trialkyl aluminum, alkyl aluminum halides and mixtures thereof.

26. The method of claim 25 wherein the aluminum-containing cocatalyst is a trialkyl aluminum compound.

27. The method of claim 26 wherein the trialkyl aluminum compound is triethylaluminum.

28. The method of claim 1 wherein the cocatalyst modifier is a hydrocarbyl alkoxysilane compound.

29. The method of claim 28 wherein the hydrocarbyl alkoxysilane is isobutyltrimethoxysilane.

30. The method of claim 1 wherein the alpha-olefin contains from 2 to about 12 carbon atoms.

31. The method of claim 30 wherein the alpha-olefin is propylene or copolymers thereof.

32. The method of claim 6 wherein the amount is from about 1 to about 10 μmole of transition metal ester per 1 gram of filler.

* * * * *